Patented Jan. 30, 1934

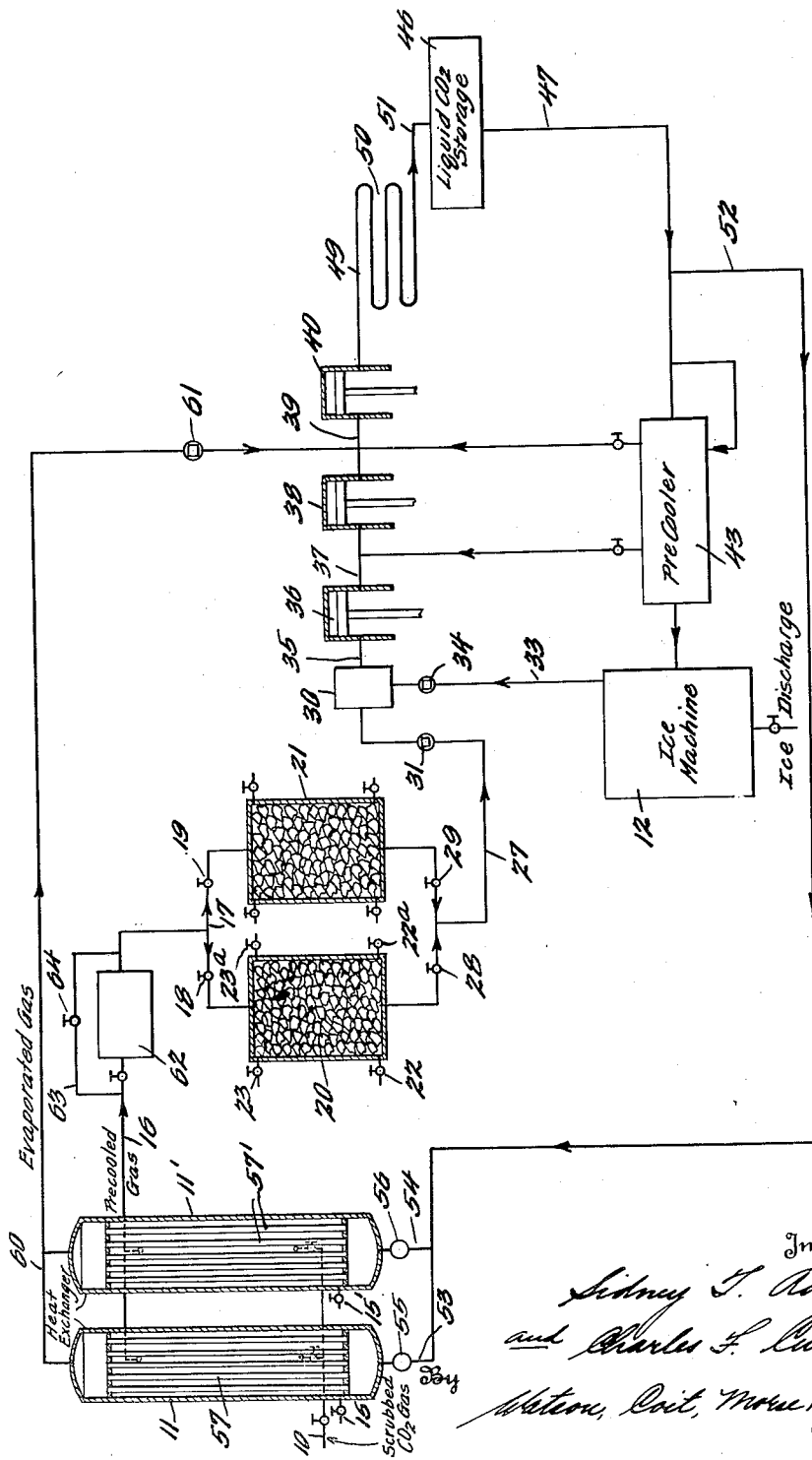

1,945,407

UNITED STATES PATENT OFFICE 1,945,407

PROCESS OF PURIFYING GASES

Sidney T. Adair and Charles F. Cushing, Baltimore, Md., assignors, by mesne assignments, to Chester F. Hockley, receiver for The Silica Gel Corporation, Baltimore, Md., a corporation of Maryland Application September 25, 1931
Serial No. 565,023

5 Claims. (Cl. 183—115)

This invention relates to processes of purifying liquefiable gases and more particularly to processes for treating such gases containing impurities including water vapor and organic compounds.

The invention, while applicable to various gases which can be liquefied, is particularly intended for the purification of carbon dioxide and is here disclosed in connection with that gas, although it will be understood that other gases can be treated in a similar manner without departing from the spirit of the invention.

Carbon dioxide is available in many forms both naturally and as a result of chemical processes, where it is, to some extent, a by-product from the fermentation of many different materials, as for example, molasses, grains of all kinds, and potatoes. Large quantities of carbon dioxide gas are produced and even after this is scrubbed in the usual manner to remove the alcohol there still remains a number of impurities, such as water vapor and odoriferous organic compounds, the chemical composition of which is not at present well understood.

Carbon dioxide is also produced by the combustion of coke or other carbonaceous material, but even after the removal of by-products and impurities by standard processes, it still contains a quantity of water vapor and other impurities.

The impurities in the carbon dioxide obtained from the above mentioned and other sources must be removed if the gas is to be used commercially, for example, for the manufacture of dry ice, liquid carbon dioxide for various purposes, or for carbonating beverages.

In the process of making liquid carbon dioxide, which may or may not be a step in the manufacture of dry ice, the raw $CO_2$ is purified, liquefied by several stages of compression and subsequent cooling, and then if dry ice is to be made, is expanded to produce the cooling for forming $CO_2$ snow which is later compressed into ice cakes, a portion of the liquid evaporating during the expansion to produce the cooling.

In accordance with the present invention, the raw or scrubbed $CO_2$ gas before compression is cooled to a low temperature for the purpose of materially reducing its moisture content by the condensation of the moisture when the gas temperature is lowered below the dew point. This makes it possible to purify the gas and completely dry it with a greatly reduced amount of dehydrating and/or purifying agent.

One of the important objects of the present invention comprises the initial cooling of the gas for the purpose of moisture reduction by the expansion of a porton of the liquefied gas.

An important feature of the invention resides in expanding a small portion of the liquefied gas to indirectly cool the incoming gas prior to its treatment with a dehydrating agent and in returning the gas resulting from this expansion to an appropriate point in the circuit which corresponds substantially to its pressure, i. e. between stages of the compression.

Another important feature of the invention resides in the dehydration and purification in two steps or stages subsequent to the moisture condensation by cooling, and in which first a dehydrating agent is used to remove the remaining moisture or substantially all of it, and second in which an adsorbent material is used for the purpose of removing from the gas any remaining traces of moisture and odoriferous compounds.

Other objects and features of novelty will be apparent from a consideration of the accompanying drawing and following specification, wherein is disclosed an exemplary embodiment of the invention with the understanding, however, that various changes may be made therein without departing from the spirit of the invention.

In the drawing:

The single figure illustrates diagrammatically apparatus for carrying out the process of the present invention.

The raw carbon dioxide gas obtained from fermentation in the production of alcohol or by any other of the known methods, after scrubbing, is conveyed by the pipe 10 to either one of the heat exchangers 11, 11' by the manipulation of the valves shown between that pipe and the jackets of the exchangers, and in these exchangers the gas is cooled by means of expanded liquid carbon dioxide, previously purified. This liquid $CO_2$ prior to expansion is at approximately a temperature of 0° F. and a pressure of about 1,000 pounds plus or minus, but on expansion lowers the temperature sufficiently to extract heat from and cool the raw gas entering the heat exchanger to a temperature of approximately 40° F. which results in condensing a large percentage of the moisture and condensible constituents which are drained from the jacket of the heat exchanger through one of the drain valves 15, 15'.

The cooled and partially dried gas flows from the operating heat exchanger through the pipes 16 and 17 into one of the adsorbers 20 or 21 in accordance with the manipulation of the valves 18 and 19. If it is desired to introduce the gas into the adsorber 20 the valve 18 is opened and the valve 19 is closed, and for using the other adsorber the valve positions are reversed. The adsorbers are filled with a solid, porous, adsorbent material, such as a gel of silica, alumina, tungstia, titania or stannia, or with activated carbon. Preferably, both adsorbers are charged with silica gel.

In the adsorber, the remaining moisture and odoriferous compounds associated with the gas are adsorbed or taken up by the adsorbent material therein. Owing to the previous reduction in the quantity of moisture in the gas, there is but a small quantity remaining so that the adsorbent material is not called on to remove much moisture, and is therefore better able and capable of removing all of the remaining objectionable impurities.

When the adsorbent material in each of the respective adsorbers becomes spent, it is revivified or reactivated, in any of the well-known manners, preferably by introducing hot gases into the adsorber and exhausting them charged with the impurities removed from the adsorbent. For reactivating the adsorbent material in the adsorber 20, the hot gases are introduced through the inlet 22 and discharged with the removed substances at 23. If preferred, steam or other fluid may be used as the activating medium. Any suitable cooling phase may follow to lower the temperature of the adsorbent material preparatory to its reuse. For this purpose, cooled air or carbon dioxide may be introduced through the valve 22ᵃ and withdrawn at 23ᵃ.

It will be understood that the corresponding valves shown on the adsorber 21 are used in the manner described in connection with the adsorber 20.

The purified gas is conveyed from the adsorber into the pipe line 27 under the control of the valves 28 or 29. The pipe 27 discharges through the check valve 31 into the surge tank 30 where the carbon dioxide, in the case of ice manufacture, may be mixed with some or all of the waste evaporated gas from the ice machine 12 returning through the pipe 32 and check valve 34.

From the surge tank 30, gas flows through the pipe 35 into the first stage 36 of the compressor, thence through the pipe 37 into the second stage 38 of the compressor and through the pipe 39 into the third and final stage 40 of the compressor.

The purified gas in its high compressed state is discharged from the third stage 40 of the compressor through the pipe 49 into the cooler 50 which serves to liquefy it for delivery through the pipe 51 into the liquid storage tank 46, from which it is delivered by pipe 47 to the precooler 43 of the ice machine.

For cooling in the heat exchangers 11, a quantity of the liquid carbon dioxide is delivered through the pipe 47 and pipe 52 to one of the branch pipes 53 and 54, each feeding into an expansion valve 55 and 56 respectively where the liquid is permitted to expand into a gas which is delivered through the tubes 57, 57' of the heat exchangers to adsorb the heat from the incoming raw $CO_2$ which is in contact with the outside of these tubes.

Heat exchangers are provided in duplicate so that one can be held in reserve in the event that water is frozen on the tubes of the other to such an extent as to prevent its effective operation. On the occurrence of such a condition, the exchangers can be switched and the frozen one allowed to warm up.

The expanded gas is discharged from the heat exchangers into pipe 60 and its pressure is approximately 300 pounds to the square inch. In order that this gas be not wasted, it is returned to the circuit at a point having substantially this same pressure. Under ordinary circumstances, it is found that this pressure exists between the second and third stages of the compressor so that the pipe 60 is conveniently connected to the pipe 39 between the stages 38 and 40 of the compressor, preferably through a suitable check valve 61.

While the preferred treatment is that just described, it is possible to treat the cooled gas in other ways, for instance, by first contacting the same with a suitable dehydrating agent, such as, for instance, concentrated sulphuric acid, potassium hydroxide, calcium chloride and the like, so as to extract the remaining moisture therefrom, and then contacting the gas with the solid, porous, adsorbent material, such as previously mentioned for use in the adsorbers 20 and 21. For this purpose, there may be inserted in the pipe 16 between the heat exchangers and the adsorbers a suitable container 62 for the dehydrating agent, and there may be provided a bypass pipe 63 with a valve 64 therein in case it is not desired to use the dehydrating agent.

If all of the odoriferous compounds exhausted with the cooled gas are water soluble, the cooled gas may be completely dehydrated and purified by contacting the gas with a dehydrating agent, such as those mentioned above, without subsequent treatment of the gas with the solid adsorbent material. By precooling the gas, it is possible to completely dehydrate and purify it with only about one-half the quantity of dehydrating agent as if the precooling had not been effected.

This process is particularly advantageous in that the cooling of the entering raw gas may be continuously effected because of the presence of a quantity of liquid carbon dioxide in the storage tank 46 at all times so that the system can be designed to function at maximum efficiency under all conditions of operation.

Having thus described the invention, what is claimed as new and desired to be secured by Letters Patent is:

1. The process of purifying a liquefiable gas comprising the steps of compressing and liquefying the gas, expanding some of the liquid, transferring heat from the gas prior to compression to the expanded liquid to separate moisture from the gas, contacting the cooled gas with a dehydrating agent to remove more moisture, passing the dehydrated gas through solid, porous, adsorbent material to remove odoriferous compounds, and supplying the purified gas for said compression.

2. The process according to claim 1 wherein the dehydrating agent is sulphuric acid.

3. The process according to claim 1 wherein the solid, porous, adsorbent material is a gel.

4. The process according to claim 1 wherein the solid, porous, adsorbent material is silica gel.

5. The process of purifying carbon dioxide containing water and odoriferous compounds, consisting in liquefying the same, cooling the gas to be treated with expanding liquid from said liquefication step thereby separating water therefrom, contacting the cooled gas with a dehydrating agent to extract more moisture, contacting the dehydrated gas with a solid, porous, adsorbent material to remove the odoriferous compounds, and delivering the thus treated gas for compression and liquefication.

SIDNEY T. ADAIR.
CHARLES F. CUSHING.